Jan. 4, 1938.  A. T. BREMSER  2,104,150
INTERNAL COMBUSTION ENGINE
Filed Nov. 29, 1933  3 Sheets-Sheet 1
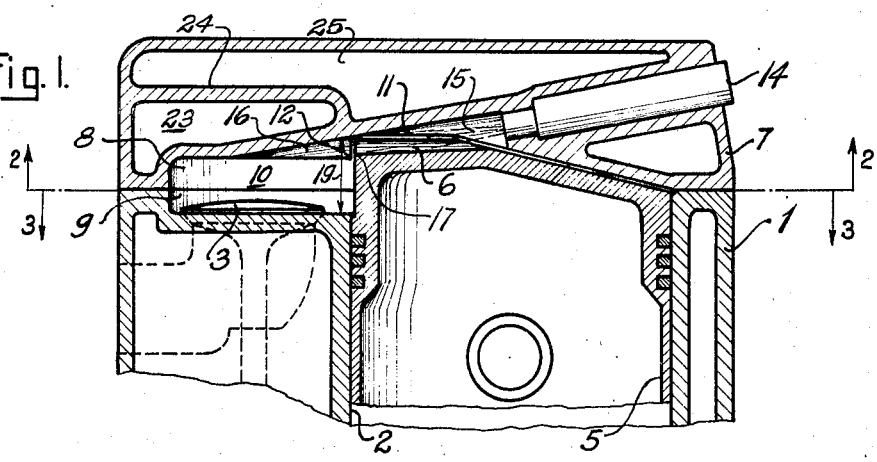
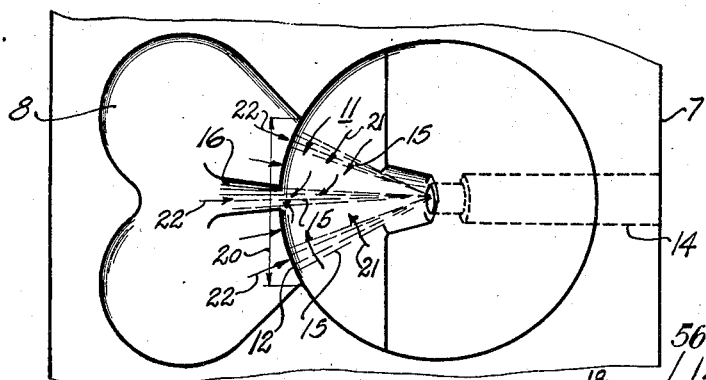
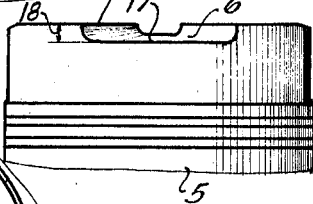
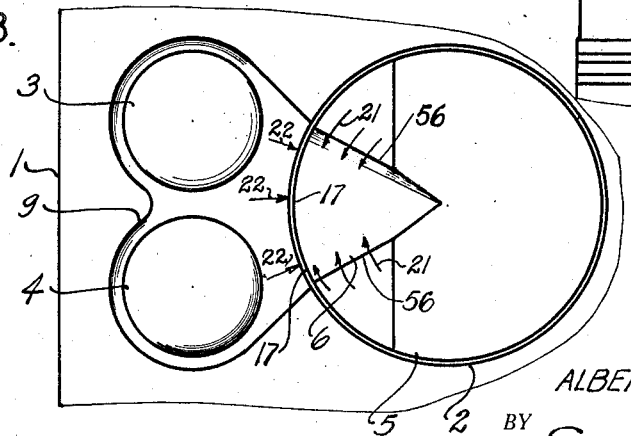
INVENTOR.
ALBERT T. BREMSER.
BY
ATTORNEY.

Jan. 4, 1938. A. T. BREMSER 2,104,150
INTERNAL COMBUSTION ENGINE
Filed Nov. 29, 1933 3 Sheets-Sheet 2
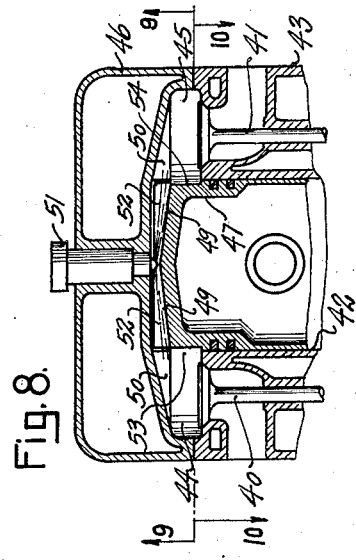
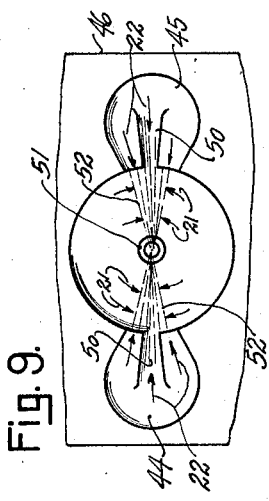
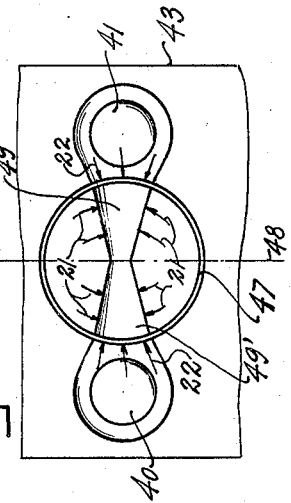
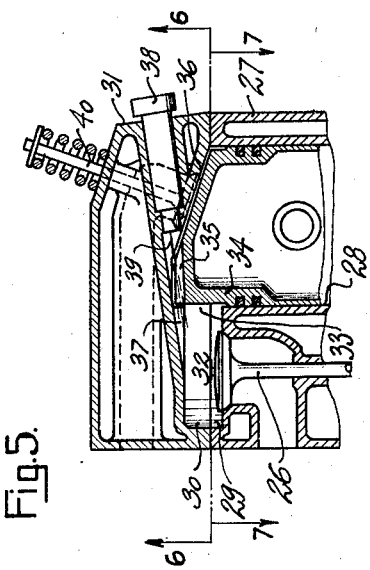
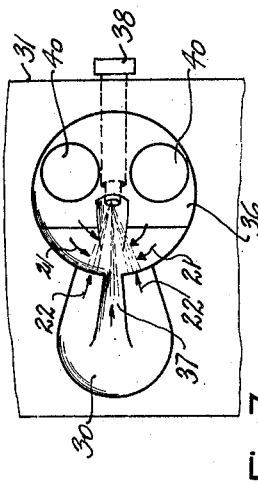
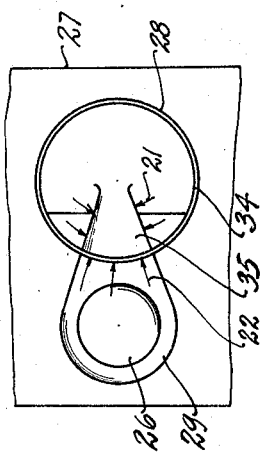
INVENTOR.
ALBERT T. BREMSER.
BY
ATTORNEY.

Jan. 4, 1938.  A. T. BREMSER  2,104,150
INTERNAL COMBUSTION ENGINE
Filed Nov. 29, 1933   3 Sheets-Sheet 3
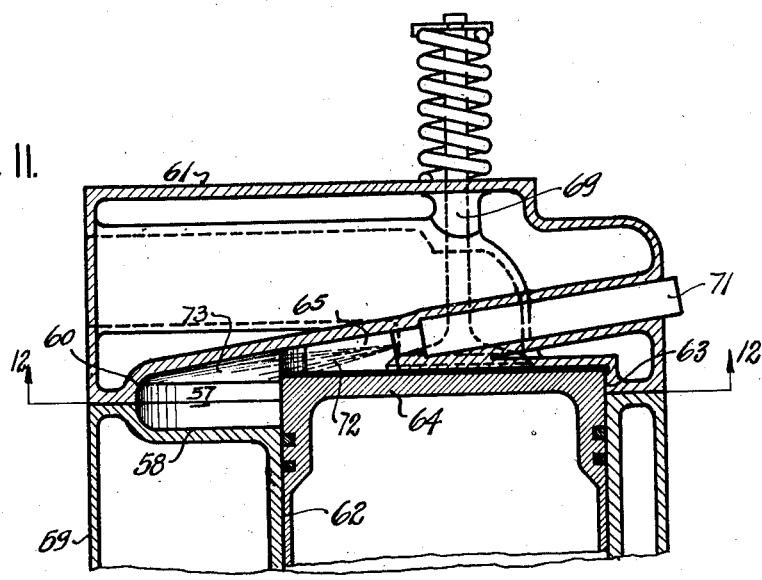
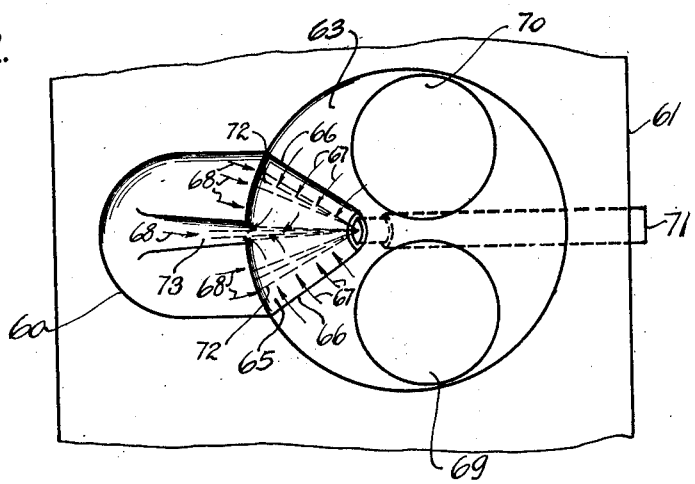
INVENTOR.
ALBERT T. BREMSER.
BY
ATTORNEY.

Patented Jan. 4, 1938

2,104,150

UNITED STATES PATENT OFFICE 2,104,150

INTERNAL COMBUSTION ENGINE

Albert T. Bremser, Westmont, N. J.

Application November 29, 1933, Serial No. 700,309

3 Claims. (Cl. 123—32)

This invention relates to internal combustion engines of the compression ignition type. Its object is to provide a combustion chamber with many distinct advantages.

One advantage is that the application of my improved combustion chamber to compression ignition engines is not hampered by the arrangement of the inlet and exhaust valves, so that it can be applied to L-head, F-head and T-head engines. A further advantage is that a well directed turbulent movement of air and gas occurs during the entire injection and combustion period of the engine cycle, resulting in rapid but controlled combustion of the fuel. Another advantage is that my improved combustion chamber results in a smoothness of running, which so far has been obtained only with pre-combustion chambers and aircells, but it avoids the disadvantages of the last named combustion chambers.

In the accompanying drawings various forms of my combustion chamber are illustrated, those parts of the engines, which are not absolutely necessary for the understanding of the invention, being omitted.

In the drawings:

Figure 1 is a sectional elevation of the upper end of the cylinderblock, the piston and the cylinderhead of an L-head engine employing my combustion chamber.

Figure 2 is a plan view of the underside of the cylinderhead shown in Figure 1, as indicated by arrows 2—2 of Figure 1.

Figure 3 is a plan view of the cylinderblock with the piston inserted, as indicated by arrows 3—3 of Figure 1.

Figure 4 is an elevation of the upper end of the piston of Figures 1 and 3.

Figure 5 is a sectional elevation of the upper end of an F-head engine employing my combustion chamber, Figure 6 is a plan view of the underside of the cylinder head of Figure 5, indicated by arrows 6—6 of Figure 5.

Figure 7 is a plan view of the cylinderblock and piston of Figure 5, as indicated by arrows 7—7 of Figure 5.

Figure 8 illustrates the application of my improved combustion chamber to a T-head engine, showing a sectional elevation of the upper end of it.

Figure 9 is a plan view of the underside of the cylinderhead of Figure 8 as indicated by arrows 9—9 of Figure 8.

Figure 10 is a plan view of the cylinderblock and piston of Figure 8, as indicated by arrows 10—10 of Figure 8.

Figure 11 shows a modified form of my combustion chamber applied to a valve-in-head engine. It shows a sectional elevation of the upper end of the engine.

Figure 12 is a plan view of the cylinderhead of Figure 11 as indicated by arrows 12—12 of Figure 11.

In Figure 1 numeral 1 indicates a cylinderblock, having a cylinder bore 2 and an inlet valve 3 and exhaust valve 4, the latter not shown, mounted parallel or at a slight angle to the axis of the cylinder bore 2 and seated in the cavity 9. Piston 5 in the cylinder 2 is shown in its upper dead center position, and extends well above the upper face of the cylinderblock. The piston head has a cavity 6. A cylinderhead 7 is attached to the cylinderblock 1. The cavity 11 is formed as a continuation of the cylinder bore and adopts piston 5 with the smallest practical clearance. The cavity 8 is a lateral continuation sideways of cavity 11 and forms together with the cavity 9 in the cylinderblock 1 the larger volumetric portion of the compression and combustion space and will be referred to as auxiliary combustion chamber 10. The combined depths of 8 and 9 permit the opening of valves 3 and 4. A fuel spraynozzle 14 is positioned in the cylinderhead, projecting fuel jets 15, directed to pass into and across cavity 6. A restricted channel 16 is formed in the cavity 8. Cavity 6 is called the mixing space.

Figure 2 shows the shape of cavities 8 and 11 and their relative arrangement and also indicates that channel 16 is located in the pass of one of the fuel jets 15.

Figure 3 illustrates the arrangement of the cavity 9 with respect to the inlet and exhaust valves 3 and 4 and also shows the shape of cavity 6 in piston 5.

Figure 4 illustrates the head of piston 5 showing the depth 18, the width 17 and the edges 56 of cavity 6.

The operation is as follows:

During the early part of the suction stroke the piston 5 uncovers the full area, indicated by numerals 19 and 20, of the passage between the chamber 10 and the cylinder 2, so that an unrestricted flow of air, entering chamber 10 through valve 3, into the engine cylinder is obtained. During the greater part of the compression stroke a smooth flow of air from the cylinder into the chamber 10 takes place on account of the wide passage between the cylinder and the chamber 10. During the latter part of the compression stroke the cross-sectional area of the last named passage is being progressively reduced, so that despite the decreasing piston velocity a rapid, but controlled movement of air into chamber 10 occurs until the piston reaches top dead center position. Shortly before the edge 17 of the piston registers with edge 12 of cavity 8, fuel injection begins and the jets 15 will travel across cavity 6 into chamber 10. Shortly before top dead center the edge 17 will register with edge 12 so that nearly all the air is forced to enter chamber 10 through the restricted channel 16. The edges 56 of cavity 6 will tend to direct the air into the cavity 6 in the direction of arrows 21 and since the outer fuel jets 15 are parallel or nearly parallel to the edges 56, air will pass through these jets at a pronounced and preferably right angle and will be impregnated with fuel.

It is evident that a very high air pressure is built up at the entrance of channel 16 and in cavity 6 at the time injection begins. This pressure is higher than that prevailing in chamber 10 and therefore, also the temperature in 6 is higher, resulting in ignition of the fuel in 6 prior to ignition in chamber 10. Therefore, at least part of the fuel will be ignited in 6 and the flame will travel rapidly but at a controlled velocity into chamber 10 through channel 16, carrying along unburned fuel. Combustion will continue in chamber 10. When the piston has reached the top dead center position the flow of air into chamber 10 will cease. The pressure in 10 will rise above the pressure in the cavity 6 on account of combustion. Fuel injection continues and air mixed with combustion gases flows back into the cavity 6 from chamber 10 in the direction of arrows 22 at first through channel 16 only and then through the entire width 20 of chamber 10 and the direction of flow is substantially opposite to that of the fuel jets 15. The return flow of air and gases from chamber 10 into cavity 6 also takes place at a velocity controlled by progressively increasing the cross-sectional area of the passage between chamber 10 and the engine cylinder. Since the width 20 of cavity 8 is equal to the width 17 of the piston cavity 6 the return flow of gases and air will proceed through cavity 6 at least as long as fuel injection is not terminated and preferably until combustion is completed. During further downward movement of the piston at rapidly increasing velocity, the cross-sectional area of the passage between chamber 10 and the cylinder space will be enlarged progressively and continually thus permitting unrestricted expansion of combustion gases during the expansion stroke. The wide passage between the auxiliary combustion chamber and the cylinder avoids that exhaust gases are trapped in this chamber and permits the diffusion of such gases into the fresh charge of air during the suction stroke of the engine. The injection and combustion process, controlled in the manner described, results in smooth operation of the engine. Distribution of fuel throughout the auxiliary combustion chamber and unrestricted expansion immediately following the combustion results in a high power output. The wall of cavity 8 can remain uncooled, by providing an airspace 23 which is separated from the waterjacket 25 by wall 24. During the suction stroke the incoming air charge will cool the chamber walls sufficiently.

A narrow but deep channel 16 is illustrated in Figures 1 and 2, but this channel may take the entire width 20 of cavity 8 and will then be made very shallow, so as to form a long but narrow slot like restricted passage with the edge 17 of cavity 6 when the piston 5 is in its upper dead center position.

From Figures 5, 6 and 7 it is evident that the improved combustion chamber described above can be used in conjunction with the valve arrangement, typical for so-called F-head engines. In this construction one kind of valve, for instance the exhaust valve 26 is located in the cylinderblock 27 on the side of the cylinder 28 and parallel or at a slight angle to the latter. Cavity 29 is formed in the top of 27 and around valve 26 and the continuation of cavity 29, formed as cavity 30 in the cylinderhead 31, permits opening of valve 26. Cavities 29 and 30 form the auxiliary combustion chamber 32. A large passage 33 permits unrestricted flow of gases from the cylinder 28 into the auxiliary combustion chamber during the greater part of the piston stroke. Piston 34 has a cavity 35. It is of the same construction as piston 5 of Figures 1, 3 and 4 and, when in its upper dead center position, displaces the air contained in the cavity 36 of cylinder head 31 into chamber 32. Channel 37 serves the same purpose as channel 16 of Figures 1 and 2. A spraynozzle 38 projects fuel jets 39. Inlet valves 40 are positioned in the cylinder head 31. Arrows 21 and 22 indicate the direction of flow of air and gases during the injection and combustion period of the engine cycle.

In Figures 8, 9 and 10 inlet valves 40 and exhaust valves 41 are mounted on each side of the cylinder 42 in the cylinderblock 43 and open into separate chambers 44 and 45, formed in the cylinder head 46. The piston 47 is constructed symmetrically about line 48—48 and has two cavities 49 of identical construction and each cavity 49 corresponds to cavity 6 in piston 5 of Figures 1, 3 and 4. Channels 50 serve the same purpose as channel 16 in Figures 1 and 2. A spraynozzle 51 is located in the cylinderhead in the middle of the cylinder and projects two jets of fuel 52. Piston 47 is shown in the upper dead center position. Arrows 21 and 22 indicate the direction of flow of air and gases. The injection and combustion process takes place in substantially the same manner as explained in the description of Figures 1 to 4 inclusive.

In Figures 11 and 12 a variation of construction of my improved combustion chamber is applied to a valve-in-head engine. The auxiliary combustion chamber 57 is formed by the cavity 58 in the cylinder block 59 and the cavity 60 in the cylinder head 61 opening laterally into the cylinder 62 and the cavity 63, the latter formed as a continuation of the cylinder 62. The mixing space is formed by the flat piston head 64 and the cavity 65 as shown. This cavity corresponds to cavity 6 of piston 5 of Figures 1, 3 and 4. The edges 66 tend to direct the air in the direction indicated by arrows 67 during that portion of the injection and combustion cycle which occurs during the latter part of the compression stroke, while arrows 68 indicate the return flow of air and gas through cavity 65 into the cylinder. An inlet valve 69 and an exhaust valve 70 are mounted in the cylinder head as shown and a spray nozzle 71 projects the fuel jets 72 into cavity 65. One jet is directed into the restricted channel 73, which during the greater portion of the injection period is the major communicating passage between the auxiliary combustion chamber 57 and the cavity 65. The injection and combustion cycle is substantially the same as that occurring in the engines illustrated in Figures 1 to 10 inclusive.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. In a compression ignition engine of L-head construction a cylinder block, a cylinder bore and inlet and outlet valves in said cylinder block, said valves mounted on the side of said cylinder, a cylinder head, a first cavity in said cylinder head, adapted to form a chamber about said valves, a second cavity in said cylinder head adjacent said first cavity and adjacent said cylinder bore, a piston in said cylinder bore, a cavity in said piston, said piston adapted to enter said second cavity during the latter part of the upstroke of said piston and said piston cavity to form a mixing space with said cylinder head only while said piston is near and in its top dead center position, a passage between said mixing space and said valve chamber and said piston adapted to partly close said passage when entering said second cavity, and a fuel nozzle adjacent said mixing chamber and opposite said valve chamber in said cylinder head.

2. In a compression ignition engine of the F-head construction a cylinder block, a cylinder bore and at least one valve in said cylinder block, said valve mounted on the side of said cylinder, a cylinder head, a first cavity in said cylinder head, adapted to form a chamber about said valves, a second cavity in said cylinder head adjacent said first cavity and adjacent said cylinder bore, a piston in said cylinder bore, a cavity in said piston, said piston adapted to enter said second cavity during the latter part of the upstroke of said piston and said piston cavity to form a mixing space with said cylinder head only while said piston is near and in its top dead center position, a passage between said mixing space and said valve chamber, and said piston adapted to partly close said passage when entering said second cavity, and a fuel nozzle adjacent said mixing chamber and opposite said valve chamber in said cylinder head.

3. In a compression ignition engine having a cylinder and a piston reciprocating therein and a cylinder head, a valve chamber adapted to serve as an auxiliary combustion chamber arranged entirely at the side of said cylinder, a mixing space formed by a triangle shaped cavity in the top of said piston in cooperation with the cylinder head during the time of fuel injection, a passage connecting said chamber with said cylinder the cross-sectional area of said passage being large enough to permit unrestricted entry of air into and exhaust gases out of said cylinder, a fuel spray nozzle positioned to project jets of fuel across said mixing space through said passage and then into said chamber and said piston adapted to transfer combustion air from said cylinder into said chamber, said piston further characterized by the feature that the edges of said cavity will cause said air to pass through the outer fuel jets at a pronounced angle while said piston progressively reduces the cross-sectional area of said passage.

ALBERT T. BREMSER.